United States Patent
Srinivasan et al.

(10) Patent No.: US 8,073,820 B2
(45) Date of Patent: Dec. 6, 2011

(54) METHOD AND SYSTEM FOR A DATABASE TO MONITOR AND ANALYZE PERFORMANCE OF AN ELECTRONIC DESIGN

(75) Inventors: Krishnan Srinivasan, Cupertino, CA (US); Chien-Chun Chou, Saratoga, CA (US); Pascal Chauvet, San Mateo, CA (US)

(73) Assignee: Sonics, Inc., Milpitas, CA (US)

( * ) Notice: Subject to any disclaimer, the term of this patent is extended or adjusted under 35 U.S.C. 154(b) by 794 days.

(21) Appl. No.: 12/098,614

(22) Filed: Apr. 7, 2008

(65) Prior Publication Data
US 2009/0254525 A1  Oct. 8, 2009

(51) Int. Cl.
- G06F 7/00 (2006.01)
- G06F 17/00 (2006.01)
- G06F 17/50 (2006.01)

(52) U.S. Cl. .................... 707/688; 703/14
(58) Field of Classification Search .......... 707/688, 707/769; 703/14
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,330,225 B1 | 12/2001 | Wingard et al. | |
| 6,505,260 B2 | 1/2003 | Chin et al. | |
| 6,578,117 B2 | 6/2003 | Weber | |
| 6,601,024 B1 * | 7/2003 | Chonnad et al. | 703/14 |
| 6,662,251 B2 | 12/2003 | Brock et al. | |
| 6,976,106 B2 | 12/2005 | Tomlinson et al. | |
| 7,149,829 B2 | 12/2006 | Weber et al. | |
| 7,165,094 B2 | 1/2007 | Weber et al. | |
| 7,353,162 B2 * | 4/2008 | Huang et al. | 703/23 |
| 2002/0184602 A1 * | 12/2002 | Yokoyama et al. | 716/1 |
| 2003/0046668 A1 * | 3/2003 | Bowen | 717/131 |
| 2003/0088710 A1 * | 5/2003 | Sandhu et al. | 709/321 |
| 2004/0054976 A1 * | 3/2004 | Takahashi et al. | 716/8 |
| 2004/0210696 A1 | 10/2004 | Meyer et al. | |
| 2007/0162268 A1 * | 7/2007 | Kota et al. | 703/14 |
| 2008/0005713 A1 * | 1/2008 | Singh et al. | 716/11 |
| 2008/0021888 A1 * | 1/2008 | Miller | 707/3 |
| 2008/0133489 A1 * | 6/2008 | Armstead et al. | 707/3 |
| 2010/0057400 A1 | 3/2010 | Chou et al. | |

OTHER PUBLICATIONS

Drew Wingard, Sonics, Inc., "Sonics SOC Integration Architecture", P1500 Presentation, Jan. 28, 1999, pp. 1-25.
Wolf-Dietrich Weber, Sonics, Inc., "Efficient shared DRAM Subsystems for SOC's", Systems on IC's www.sonicsinc.com, Copyright 2001, Sonics, Inc., pp. 1-6.
OCP International Partnership, "Open Core Protocol Specification", Release 1.0 OCP-IP Confidential, Document Revision 1.1.1, Copyright 2001, pp. 184 total. Alan, Kamas, The Systemc OCP Models, An Overview of the SystemC Models for the Open Core Protocol, 2004, pp. 1-30.
Anssi Haverinen, et al, White Paper for SystemC (TM) based SoC Communication Modeling for the OCP (TM) Protocol, V1.0, Oct. 14, 2002, pp. 1-39.

* cited by examiner

*Primary Examiner* — James Trujillo
*Assistant Examiner* — Jeffrey A Burke
(74) *Attorney, Agent, or Firm* — Rutan and Tucker, LLP

(57) ABSTRACT

Various methods and apparatuses are described that provide instrumentation and analysis of an electronic design having one or more bus interconnects. A relational database may have defined tables designed for interconnect analysis of transactions occurring between initiator intellectual property (IP) cores and target IP cores of the electronic design. A query tool may be configured to format input data to be stored in the defined tables, and have application programming interfaces to retrieve data from the defined tables based on performing a query. The query tool executes an algorithm based on the query to provide the interconnect analysis.

18 Claims, 8 Drawing Sheets

METHOD AND SYSTEM FOR A DATABASE TO MONITOR AND ANALYZE PERFORMANCE OF AN ELECTRONIC DESIGN

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to electronic design automation. An aspect is related to monitoring and analyzing an electronic design with a hardware performance monitor.

BACKGROUND OF THE INVENTION

Many electronic designs are written at a register-transfer level (RTL) description of a circuit or system in a hardware description language. Generally, a RTL description describes what intermediate information (i.e. information stored between clock cycles in an electronic circuit) is stored in registers, where it is stored within the design, and how that information moves through the design as it operates. The RTL description of an electronic design is a functional description at least one level of abstraction higher than the individual gate layout of the electronic design system (e.g., gate-level implementation/Netlist). The RTL description fully and explicitly describes virtually all of the logic and sequential operations of the circuit. RTL descriptions are commonly written in standard languages such as Verilog or VHDL and are intended for logic synthesis and mapping with a commercial logic synthesizer.

One prior approach for performance analysis of an electronic design may include using a hardware performance monitor located at a fixed location in a processor which is located within the electronic design. The hardware performance monitor can be monitoring on chip in silicon or with a RTL description as described above. The hardware performance monitor has a limited number of fixed non-configurable parameters to be monitored. These prior approaches are not able to quickly and efficiently monitor and analyze various parameters associated with electronic design performance early in the design cycle resulting in a longer design cycle and slower time to market for the design.

SUMMARY OF THE INVENTION

Various methods and apparatuses are described that provide instrumentation and analysis of an electronic design having one or more bus interconnects. A relational database may have defined tables designed for interconnect analysis of transactions occurring between initiator intellectual property (IP) cores and target IP cores of the electronic design. A query tool based front end may be configured to format input data to be stored in the defined tables, and have application programming interfaces to retrieve data from the defined tables and execute an algorithm to perform the specific performance analysis requested by the query tool. The query tool may perform further analysis on the retrieved results as part of performance analysis.

BRIEF DESCRIPTION OF THE DRAWINGS

The drawings refer to embodiments of the invention in which.

Figure 1A:
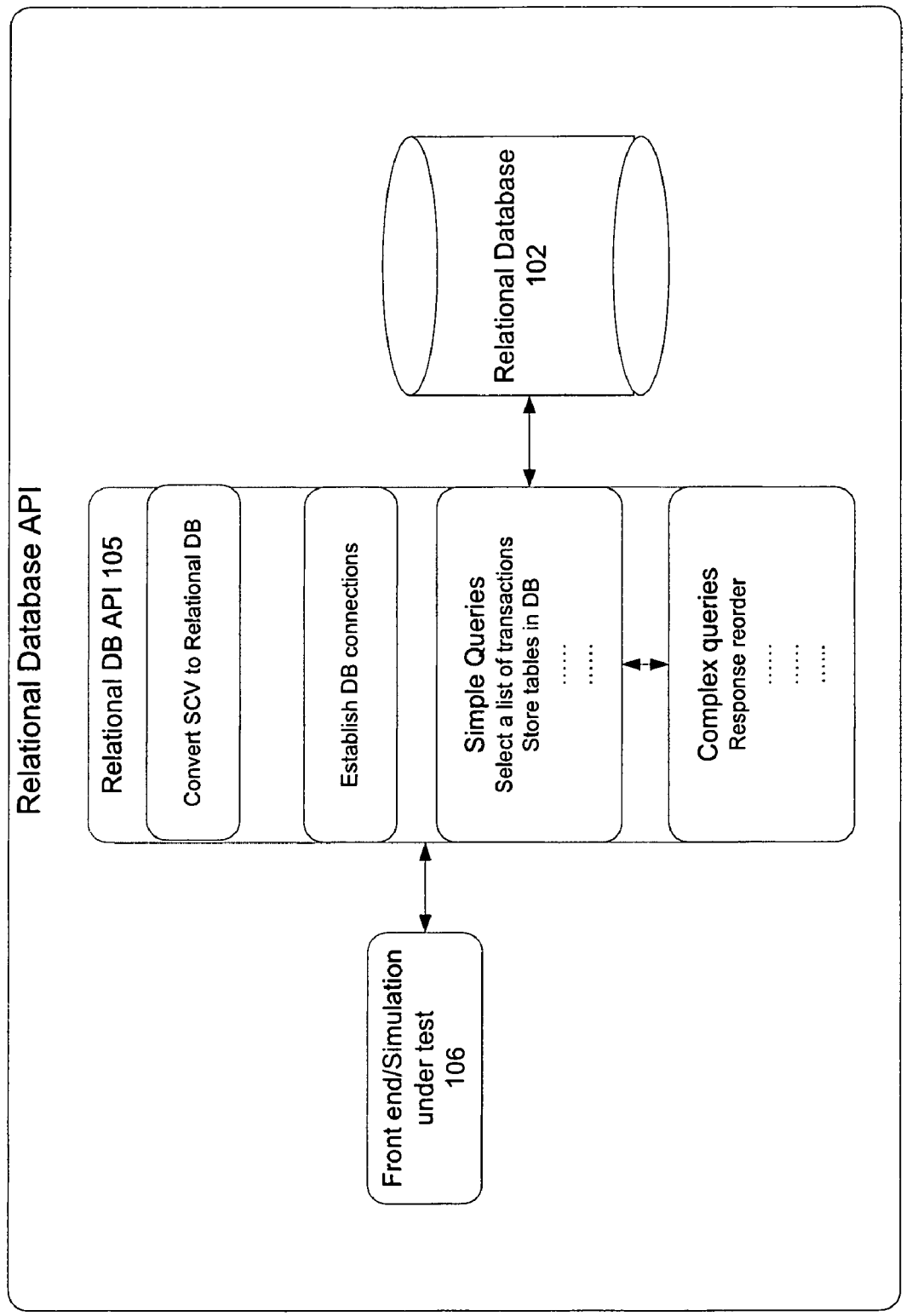
FIG. 1a illustrates a block diagram of an embodiment of an application programming interface for a relational database.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as a first model, may be made. However, the specific numeric reference should not be interpreted as a literal sequential order but rather interpreted that the first model is different than a second model. Thus, the specific details set forth are merely exemplary. The specific details may be varied from and still be contemplated to be within the spirit and scope of the present invention.

In general, various methods and apparatuses are described that provide instrumentation and analysis of an electronic design having one or more bus interconnects. A relational database may have defined tables designed for interconnect analysis of transactions occurring between initiator intellectual property (IP) cores and target IP cores of the electronic design. An application programming interface (API) suite is provided to format the input data to be stored in the tables and support a set of algorithms to enable the performance analysis of the interconnect. A front end query tool may invoke one or more APIs from the suite for performance analysis. Further, the query tool may execute other algorithms based on the results obtained from the APIs for specific performance analysis requirements. The relational database has data derived from a first performance simulation of the interconnect being modeled with a first software model written in a first programming language having a first level of abstraction as well as data derived from a second performance simulation of the interconnect being modeled written in a hardware description language model having a second level of abstraction. In one embodiment, the performance data of the interconnect between the two models can be compared to verify and debug the system design.

Figure 1B:
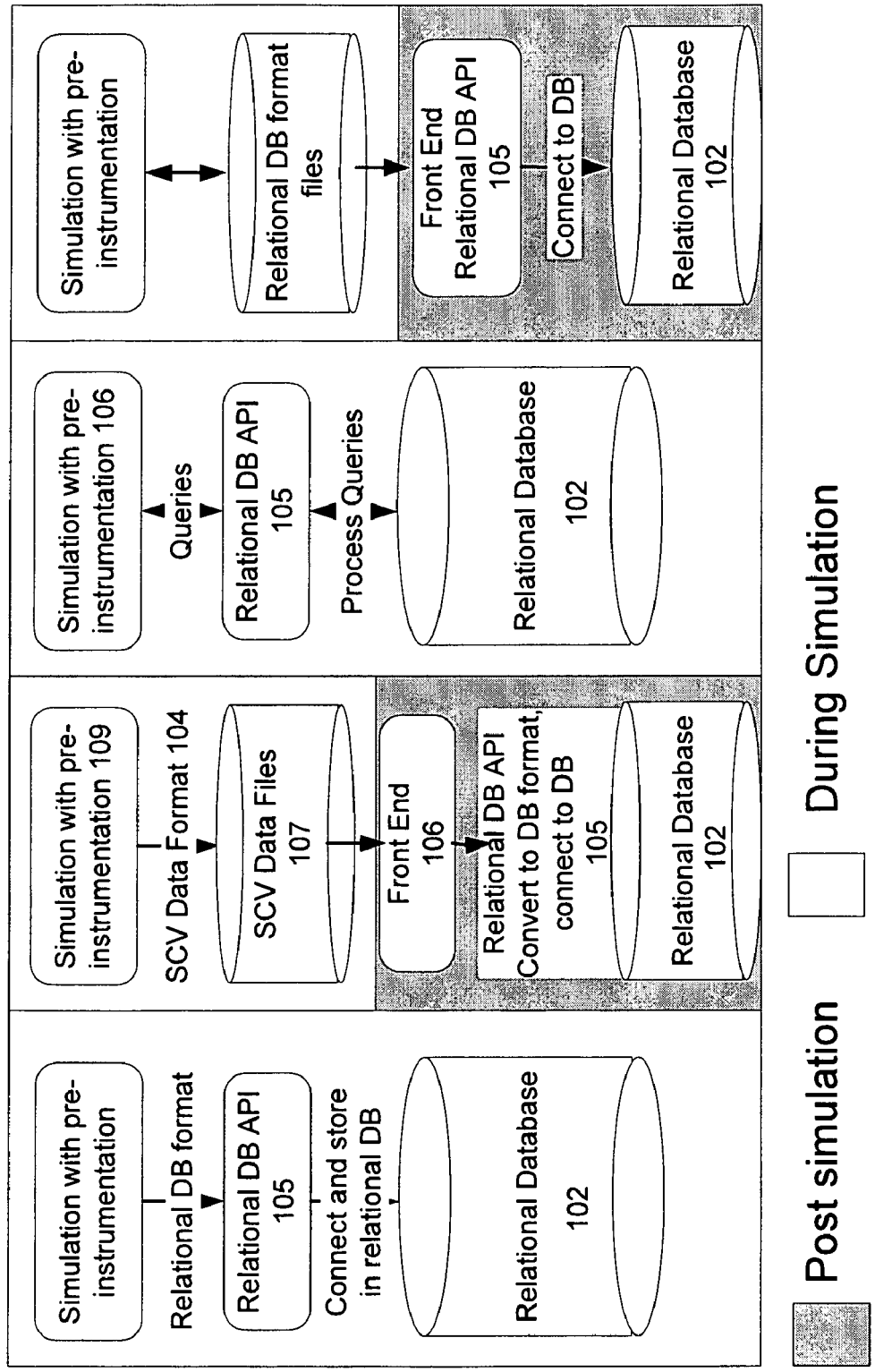
FIG. 1b illustrates a block diagram of an embodiment of the relational database query framework for interconnect analysis of an electronic design.

FIG. 1a illustrates a block diagram of an embodiment of an application programming interface for a relational database. FIG. 1b illustrates a block diagram of an embodiment of the relational database query framework for interconnect analysis of an electronic design. The framework may include a relational database 102, a suite of application programming interfaces to the relational database 105, a SystemC verification database, and a front end query tool 106.

As shown in the FIG. 1b, the framework can be used in four example different approaches. Going from the left to right, the first approach is to directly load performance data obtained from execution of a simulation having an instrumented design into the relational database 102. The second approach is to load the performance data in a different format, such as the SystemC Verification (SCV) format, and load the performance data into the relational database 102 as a post processing step through a front end query tool 106 that uses the API suite 105. In the third approach, the simulation framework also performs the functions of the query tool 106, and performance analysis is done during simulation. Finally, in the final approach, performance data is stored in a relational database format, which is loaded into the database as a post processing step using the front end query tool 106 and the API suite 105.

The API suite 105 performs four main functions: the API suite 105 converts the observed data from a given format to a relational database specific format, the API suite 105 establishes a connection with the database, the API suite 105 performs a set of simple queries that involve retrieving the data from the relational database based on filters, and finally, the API suite 105 performs a set of complex queries that operate on multiple simple queries to execute a complex algorithm.

The relational database 102 may have defined tables designed for interconnect analysis of transactions occurring between initiator intellectual property (IP) cores and target IP cores of the electronic design of an integrated circuit 108 such as a System on a chip. The relational database 102 may store the formatted data into defined tables. The defined tables may be defined in the database prior to the simulation generating the performance data or defined during the simulation itself by code in the simulation creating temporary files in the database to keep track of specific information for that simulation. Each defined table is associated with an instrumentation test point type, such as a collection Performance Observation Point s (POP), located in the interconnect of the electronic design 108 to monitor transactions occurring between initiator intellectual property (IP) cores and target IP cores of the electronic design. The defined tables may include the following: a transaction table, a queue monitor table, a latency table, a thread arbitration table, a link arbitration table, a DL monitor table, a topology specification class table, a tracking table and other similar tables.

In an embodiment, the SCV database receives SCV data files 107 from the simulation 109 in its native format. As a post processing step, a front end query tool 106 invokes certain API from the relational DB API suite 105 to convert the native format into a relational database specific format, and to store the data in the database as tables. The SystemC verification database 104 receives SystemC verification (SCV) data generated from a performance simulation of the interconnect being modeled with a SystemC model having a first level of abstraction. The SCV database 104 receives SCV data from the performance simulation of the interconnect and sends the SCV data in the form of the input data to the API 106. The SCV database 104 collects data based on the execution of the simulation the SystemC and or RTL model of the interconnect of an electronic design 108.

The front end query tool 106 utilizes a relational database 102 application programming interface to communicate with the database. The query tool 106 calls an API from the relational database API suite to format input data for storing in the database defined tables. The input data can include SystemC verification (SCV) data received directly from a performance simulation of an interconnect being modeled with a SystemC model having a first level of abstraction, a second performance simulation of the interconnect being modeled with a register transfer level (RTL) model having a second level of abstraction, a performance of a fabricated interconnect, or similar data. The query tool 106 invokes one or more of the supported query APIs in the API suite for performance analysis. In addition, the tool may execute additional algorithms for specific performance analysis of the design under test.

The query tool 106 may invoke multiple user defined queries and one or more pre-specified standard queries from the set of two or more pre-specified standard that are specified during design time of the apparatus. The pre-specified standard queries can include simple query primitives that allow a user to load and store data from and to the relational database 102 and complex queries that are algorithms to perform complex calculations.

The database API provides a tool to store the SystemC verification data in a relational database 102 format. The advantage of using a relational database 102 is that it has inherent support for queries. The DB API suite 105 is built by utilizing the query support in the relational database framework to generate a set of standard simple and complex queries. While the primitive queries filter data as per given conditions, the complex queries invoke several primitive queries and an analysis algorithm to answer a specific performance analysis requirement. Further, the query front end may employ its own analysis algorithms that operate on the results obtained from the invocation of different APIs from the API suite for further performance analysis.

The fabricated or simulated pre-instrumented interconnect 108 collects in the POPs and sends the data into a SystemC verification database 104. Based on one or more of the embodiments described in FIG. 1b, the API stores the SystemC verification data in the relational database 102. The front end query tool 106 provides interconnect specific analysis framework that uses the query support provided by the APIs. The APIs provide a user interface for querying the database with a set of standard queries that are either primitive queries, such as retrieving data subject to filters, or complex queries, such as determining the average backpressure experienced by response path mergers.

Figure 2:
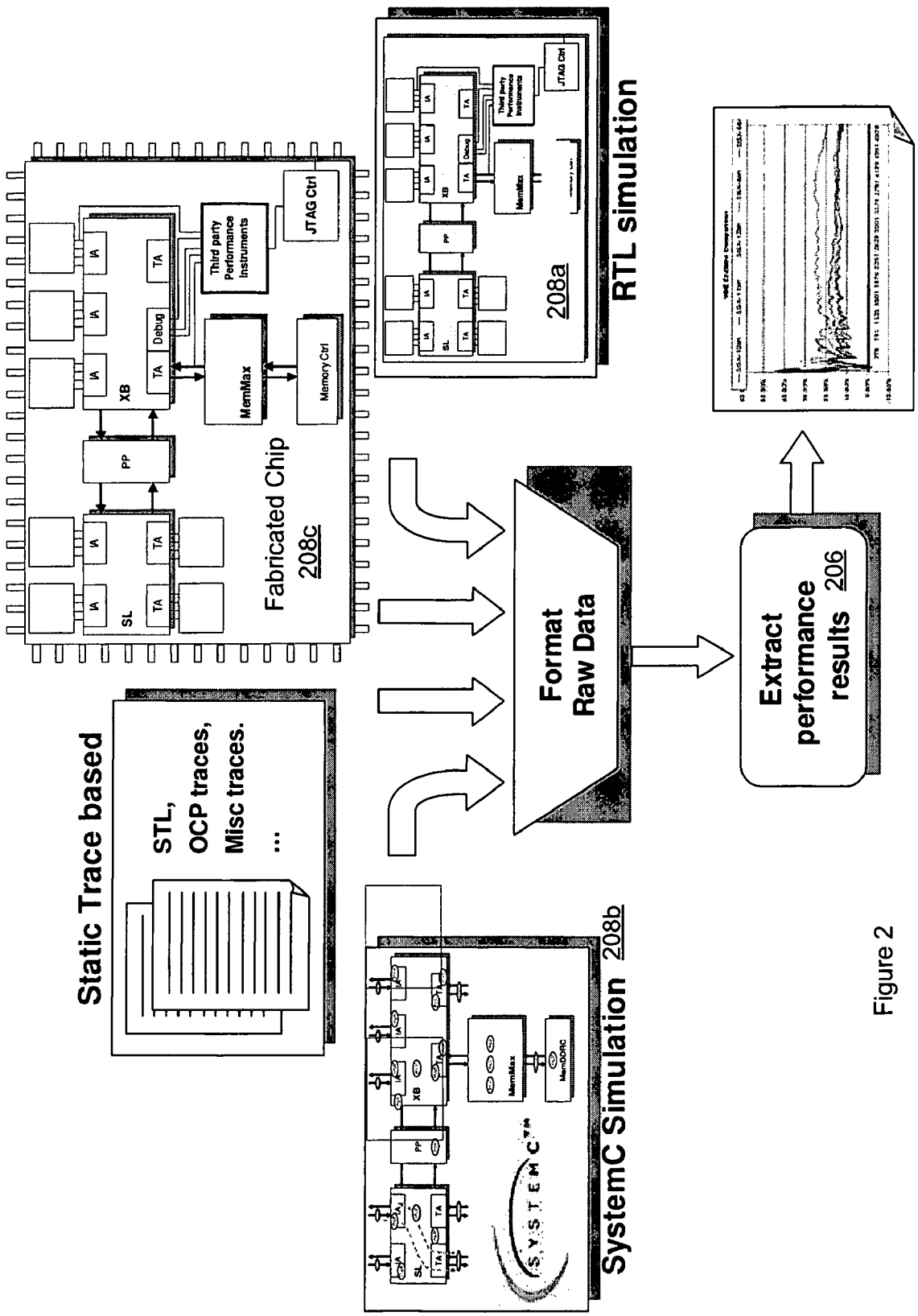
FIG. 2 illustrates a block diagram of an embodiment of performance analysis solution for interconnect analysis of an electronic design of an Integrated Circuit.

FIG. 2 illustrates a block diagram of an embodiment of performance analysis solution for interconnect analysis of an electronic design of an Integrated Circuit. Various implementations of the integrated circuit may supply transaction data for performance analysis. For example, the performance data may come from a Register Transfer Level simulation of the integrated circuit that has a bus interconnect 208a, a SystemC of the integrated circuit that has a bus interconnect 208b, and even a fabricated chip with the integrated circuit having an interconnect that has performance instrumentation points built into the interconnect 208c. The raw data is inputted into databases. The query tool 206 is then used to extract performance results. Post processing analysis of the simulations 208a, 208b or fabricated prototype 208c of the System on a Chip with a bus interconnect can be performed with the query tool 206. The performance analysis framework also incorporates performance counters and analysis algorithms that are capable of executing performance complex analysis algorithms during the simulation, thus reducing the amount of raw data output.

Note, the query tool can be the simulation itself. The query tool 206 allows analyzing data retrieved with the query by executing an algorithm for interconnect analysis. The algorithm compares data from, for example, the SystemC simulation associated with a first model and the RTL simulation associated with a second model having a second level of abstraction that models an interconnect in order to determine if the interconnect is functioning properly during run-time of the first and second simulations. These are example models and other can be compared. Each model 208a, 208b has instantiated POPs in the simulated interconnect. Likewise, synthesized instantiated POPs may be located within one or more bus interconnects in the fabricated prototype 208c. The simulated models 208a, 208b have run time processing of the performance data in order to optimize simulation speed and analysis database size. The raw data collected correlates to measurements of performance parameters on particular instrumented points to track things such as end of the boot sequence, core initialization, beginning of DMA transfers.

The query tool 206 and instrumentation points enable users to analyze and debug their design for all the different phases of the product development. In an architecture phase, a SystemC model 208b is instrumented with instrumentation test points and performance counters to provide the data to the databases. A RTL model 208a may be instrumented with hardware performance monitors to provide the data to the databases. In silicon, one or more on-chip synthesized hardware performance monitors in the integrated circuit 208c provide the data to the databases. The consistent instrumentation and common post-processing infrastructure allow easy comparisons between the different phases (SystemC vs. RTL vs. Silicon).

Figure 3:
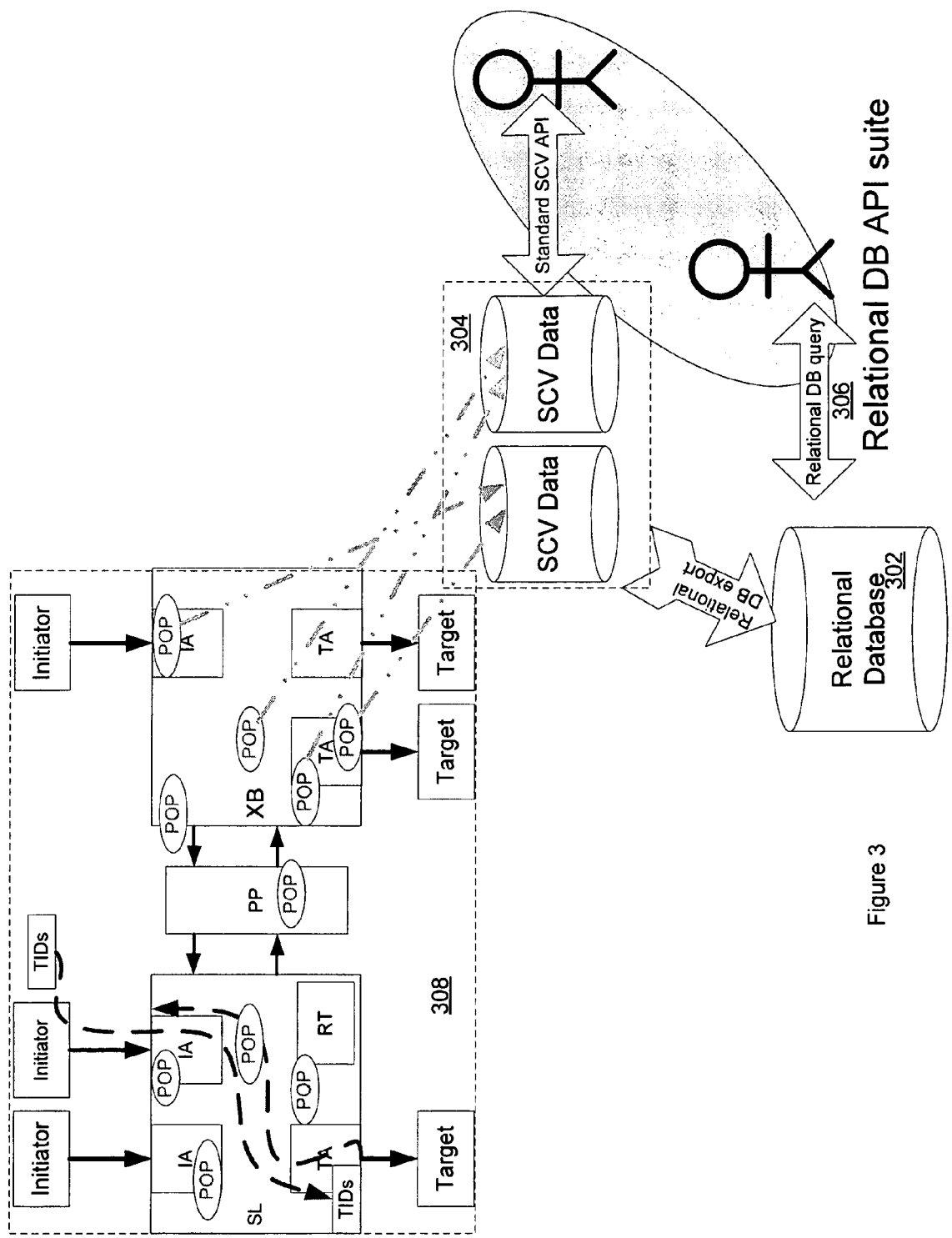
FIG. 3 illustrates a block diagram of an embodiment of an overall flow of the performance analysis environment of the bus interconnect on the integrated circuit.

FIG. 3 illustrates a block diagram of an embodiment of an overall flow of the performance analysis environment of the bus interconnect on the integrated circuit. Performance analysis of one or more interconnects in the SoC 308 is enabled by inserting one or more pre-instrumented observation points and analysis algorithms known as Performance Observation Points (POPs) in each interconnect. In short, POP instances are software objects created by the performance instrumentation infrastructure according to their definition specified by a reference manual or user. POPs, their supporting software code segments, and hardware components (e.g., wires and logics) may be all simulation-merely entities or synthesizable logic objects synthesized into the gate-level netlist of any hardware IP. The electronic design of the integrated circuit 308 with pre-instrumented POPs and TransactionID tracking is generated. POPs are used to collect raw internal activity date with tracking TransactionIDs during simulation runs.

The data from the POPs is collected and sent to a SystemC verification database 304. The performance analysis query tool 306 records the data from the instrumentation test points in the interconnect into a standard SystemC verification based format. The SystemC verification database 304 is a standard format that can easily be interpreted by existing third party analysis tools. In addition, the Performance Analysis query tool 306 also provides a translator to store the data in a relational database. The relational database 302 provides a compact database format, with powerful tools for designing and analyzing queries. Raw data is collected and consolidated into the relational database. Note, any standard data recording format that conforms to the verification requirements could also be used. However, since the format is SystemC verification specific, existing Application Programming Interfaces can then be used to retrieve useful information from the SystemC verification database 304.

A utility application of the query tool 306 loads the SystemC verification data into the relational database 302. The utility also provides extensive query support that is capable of executing both primitive and complex query algorithms for performance analysis. The query tool 306 is used to query the database for functionality validation, debugging, and performance analysis.

In addition to the standard SystemC verification format, the Performance Analysis query tool 306 also provides a framework to load data directly into a relational database. The relational database 302 is kept open such that they can design database queries specific to their requirements. Visibility to the database may exclude certain types of users. Internal and external types of users will be discussed as the way system treats these example types of users. Instead, the query tool 306 provides a set of query Application Programming Interfaces access the relational database 302 with the predefined queries.

Referring to FIG. 1, the standard queries and the SystemC verification database 104 are external-user visible entities. The external user is provided access to the standard queries, and the SystemC verification database. However, the user is not provided any visibility into the Application Programming Interface, and the relational database 102. The merely way the user can access the relational database 102 is through the standard queries. For internal users, the relational database 102 and the Application Programming Interface are made visible. Thus, users can design personalized queries to suit their specific performance analysis requirements. The standard queries include simple query primitives and complex queries.

Standard Query Application Programming Interfaces

Query primitives are simple queries that allow the user to load and store data from and to the database. As shown in the figure, these queries merely need the mysql C++ Application Programming Interface to perform the necessary processing. On the other hand, complex queries are algorithms to perform complex operations. They are typically composed of multiple calls to other primitive queries and the mysql Application Programming Interfaces.

Query primitives include at least the following example query primitives: a select transaction query to select a transaction's details based on one or more constraints, a queue details query to enqueue and dequeue time in different queues, a boundary cross query to determine all transactions that cross a channel boundary, a get initiator query to get the initiator of a given transaction, a get end time query to get an end time of a given transaction, a thread arbitration query to check the arbitration states of different units, and a thread busy query to monitor different thread busy signals.

Complex queries include at least the following example complex queries: a track transaction query to track a transaction's life in an interconnect associated with the interconnect, an overall latency query to determine an average, peak, and optimum latency of transactions over a time window, a latency distribution query to determine a distribution of latency over time, a response reorder query to check if responses are reordered correctly, a merger backpressure query to determine an average backpressure at response mergers, an address distribution query to determine a distribution of addresses per input sequence/file, a channel processing query to processing input sequence/file s for channel crossing and channel distribution, a page hit statistic query to obtain page hit statistics per burst transaction, and a page miss statistic query to obtain page miss statistics per burst transaction. A standard complex query can require the Application Programming Interface and a set of primitive queries to perform its function.

Queries may also be broadly classified into two major categories: Standard queries, and user defined queries.

The table below defines the queries and categorizes the queries into primitive and complex queries. The third column in the table lists the performance objectives that are catered to by the specific query.

TABLE 1

| Query | Primitive/ Complex | Function |
| --- | --- | --- |
| Track transaction | Complex | Track a transaction's life in the interconnect |
| Select transaction | Primitive | Select a transaction's details based on or more constraints |
| Overall latency | Complex | Average/peak/best latency of transactions over a time window |
| Latency distribution | Complex | Distribution of latency over time |
| Queue details | Primitive | Enqueue and dequeue time in different queues |
| Response reorder | Complex | Check if responses are reordered correctly |
| Merger backpressure | Complex | Average backpressure at the response mergers |
| Boundary cross | Primitive | All transactions that cross a channel boundary |
| Get initiator | Primitive | Get the initiator of a given transaction |
| Get end time | Primitive | Get end time of a given transaction |
| Thread arbitration | Primitive | Check the arbitration states of different units |
| Thread busy | Primitive | Monitor the different thread busy signals |
| Address distribution | Complex | Distribution of addresses per input sequence* |
| Channel processing | Complex | Processing of input sequences for channel crossing, and channel distribution* |
| pageHitStat | Complex | Obtain the page hit statistics per burst |
| pageMissStat | Complex | Obtain the page miss statistics per burst |

All queries return a data structure that can be manipulated as per the user's preference. These data structures can be output to a file or standard I/O based on the user's preference. The data structure is of type string[ ][ ], where string[i][j] depicts the word at row i, and column j. The format of the data structure returned is query specific and is listed below. In the tables below, the first column specifies the table, and the second column specifies the options that can be used to exercise the query. The options are annotated with "R_" for required, "O_" for optional. On presenting the optional fields, the query is filtered by that particular field. For example, if the user desires to select all transactions that originated from initiator X, the select_transaction query with an option of initiator=X would filter merely those transactions originating from X. The third column describes the fields of the data structure that is output. Note that the fields are described for merely one row. The format of the remaining fields is identical.

TABLE 2

| Query | Input option | Output data structure |
| --- | --- | --- |
| Track transaction | R_simulationName, R_transactionID | Path, Location, Simulation time, Resource name, Target |
| Select transaction | R_simulationName, O_transactionID, O_initiator, O_target, O_initiatorThread, O_IP, O_Exchange, O_startTime, O_maxTime | Transaction ID, Req St Time, Req end time, Req path latency, Resp St time, Resp end time, Resp path latency, Total latency, Burst Seq, Burst Length, Addr, BoundaryCross, InterBurstBoundaryCross, OCP thread, Initiator, Target[8] |
| Latency | R_simulationName, O_path(request, path, end_to_end), O_transactionID, O_initiator, O_target, O_initiatorThread, O_IP, O_Exchange, O_startTime, O_maxTime | Latency of the transactions selected by the input options. Depending on the path chosen, the request path latency, response path latency, or the end-to-end latency is returned. The format is Transaction ID, latency |

TABLE 2-continued

| Query | Input option | Output data structure |
|---|---|---|
| Latency distribution | R_simulationName, O_path(request, path, end_to_end), O_transactionID, O_initiator, O_target, O_initiatorThread, O_IP, O_Exchange, O_startTime, O_maxTime R_timeWindow | Latency distribution of the transactions selected by the input options. Depending on the path chosen, the request path latency, response path latency, or the end-to-end latency is returned. The data structure is: Transaction ID, time_window, latency |
| Channel processing | R_stl, R_ocpWidth | Number of words on channel1, number of words on channel2, . . . , number of words on channel n, number of bursts crossing boundary, number of bursts with last burst crossing boundary |
| Channel distribution | R_stl, R_ocpWidth, R_timeWindow, O_stTime, O_maxTime | Time window, number of words to channel 1, number of words to channel 2 . . . number of words to channel n |
| Queue analysis | R_simulationName, O_operation, O_resource, O_queue, O_minUtilization, O_maxUtilization, O_thread | SimTime, resource, queue, thread, full, size, occupancy, operation, transactionID, resourceType |
| Queue distribution | R_simulationName, O_operation, O_resource, O_queue, O_minUtilization, O_maxUtilization, O_thread, R_timeWindow, O_stTime, O_maxTime | Window start time, queue, thread, number of occupied slots, occupancy % |
| Response reorder | R_simulationName, R_stTime, R_maxTime | Transaction ID, Boolean (0 if reorder error, 1 if ok) |
| Merger backpressure | R_simulationName, R_stTime, R_maxTime | MS name, average backpressure |
| Memory BW query | R_simulationName, R_MemoryChannel, O_stTime, O_maxTime, | Channel, Time window, Utilization |
| Get initiator Address distribution | R_simulationName, R_trID R_stl, R_rtl.conf_file | Transaction ID, initiator Starting address, address window, Number of words |

Referring to FIG. 3, the following two requirements should be satisfied before the Application Programming Interface can be used:

1) the relational database 302 should be installed in one of the server machines.
2) Support for connectivity to the database from different machines using Unix sockets as well as TCP-IP should be supported.

DB API performs translation from SystemC verification to relational database format. As mentioned before, the relational database has two potential user groups: Internal and external. For external and internal users, the Performance Analysis environment provides a translator to store the SystemC verification data in a relational database format. In addition, for internal users merely, the infrastructure provides an option of loading the POP data directly into a relational database 302 during simulation. The following are the differences between the two approaches:

When dumping data from the simulation to relational database 302, the data is stored in ASCII format, thus providing full visibility to the user. On the other hand, translation from SystemC verification to relational database format stores data in a binary format, and users do not have visibility into the relational database 302.

Since the relational database 302 is visible for internal users, they can develop personalized queries on the database that suit their specific needs. On the other hand, external users can merely access the relational database 302 through pre-specified standard queries.

In an embodiment, the SystemC verification format may consist of streams, generators, and attributes. For a detailed explanation of the format, please refer to existing literature on SystemC verification format. The Performance Analysis system may use an example hierarchy as the following.

A SystemC verification stream can be defined as follows:
    scv_tr_stream(ID=unique ID, Name=POP$_{type}$, Kind=Sonics IP)

A new SystemC verification stream is created for each POP type that has been enabled. An example for the queue POP type is shown below.
    scv_tr_stream (ID 0, name "Queue", kind "SMX")

A SystemC verification generator can be defined as follows:
    scv_tr_generator(ID=unique ID, name=LocName_thread, scv_tr_stream ID of the stream, begin_attribute( ), end_attribute( ))

A SystemC verification generator is associated with each instance of a POP type at different locations in the IP. The name field identifies the location, and the thread that is of interest. In order to avoid ambiguity, the location is specified hierarchically. The generator is also associated with the stream that it belongs to by recording the stream's ID as part of the generator's definition. Finally, a set of attributes denoted by begin_attribute and end_attribute are associated with the generator.

Two examples are presented below: The first one is a queue POP for thread 0 of the embedded register point in the IA. The second is that of thread 0 in the DRL queue at the register point. Both POPs belong to the same stream identified by "queue POP type"

```
scv_tr_stream (ID 0, name "Queue", kind "SMX)
scv_tr_generator (ID 1, name "soc.smx.IA0.rs0_0", scv_tr_stream 0,
    begin_attribute( ), end_attribute( ))
.....
scv_tr_generator (ID 2, name "soc.smx.IA0.rs0.drlQ_0",
    scv_tr_stream 0, begin_attribute( ), end_attribute( ))
```

As mentioned above, the name field in the two generators is identified by the hierarchical name of the module. In the second example, the DRL queue does not have an associated hierarchical name. Therefore, the hierarchical name is appended with an extra identifier (drlQ).

Each SystemC verification generator is associated with begin-attribute and end-attribute parameters. The attributes are defined as follows:

begin_attribute (ID unique ID, name="TransactionID_transferID", type=POP$_{type}$ specific class object)

end_attribute (ID unique ID, name="TransactionID_transferNo", type=POP$_{type}$ specific class object)

The begin_attribute field indicates the data that is recorded at the beginning of the generator. Similarly, the end_attribute field denotes the data recorded at the end of the generator. The name field consists of the transaction ID of the transfer at the resource, and the transfer number of the transaction on the resource. For example, a burst with transaction ID 1 and four transfers at a particular resource would have four attributes: 1_0, 1_1, 1_2, 1_3. The transaction ID helps us identify individual transactions. Multiple attributes for the same generator denote several transfers of the same transaction, and transfers of different transactions passing through the resource. Finally, the type of the transaction is defined by a user defined class object that is specific to the POP type. An example of Queue POP type at the embedded register point of an IA is shown below.

```
scv_tr_stream (ID 0, name "Queue", kind "SMX)
scv_tr_generator (ID 1, name "soc.smx.IA0.rs0_0", scv_tr_stream 0,
    begin_attribute (ID 0, name 1_0, type
"QueuePOPType")
    end_attribute (ID 0, name 1_0, type
"QueuePOPtype")
    begin_attribute (ID 0, name 1_1, type
"QueuePOPType")
    end_attribute (ID 0, name 1_1, type
"QueuePOPtype"))
```

For all POP types other than the QUEUE POP type, the begin-attribute and end-attribute of the generator occur together and hence at the same simulation time. In other words, the end attribute of the POP is present merely to satisfy the format of the SystemC verification. On the other hand, the QUEUE POP types are organized not merely to observe the queue utilization, but also the time spent by a transfer inside the queue. Therefore, for this POP type, the begin attribute captures the enqueue operation on the transfer, and end-attribute captures the dequeue operation. Therefore, the time spent in the queue is easily calculated as the difference between the dequeue and enqueue times.

In the relational database 302, the data is organized in the form of tables. In the Performance Analysis framework, the data is organized in the form of a table per POP type. Further, in order to improve the performance of queries, an additional table is maintained to keep track of the transaction specific information such as end-to-end latency. The following is the description of example tables in the database.

The tracking table tracks transaction specific information and improves performance of queries. Transaction tracking Table 3.

| Field | Type | Description |
| --- | --- | --- |
| Transaction ID | Unsigned long long | A unique ID for each transaction entering the system |
| Start of burst | bool | 1 if start of burst, 0 otherwise |
| Address | Unsigned long long | Address of the current transfer of the burst |
| BurstSeq | Unsigned int | Burst seq (INCR, WRAP etc) |
| Burstlength | Unsigned int | Length of the burst |
| MCmd | String | Request MCmd |
| BurstSingle Req | Bool | 1 if single request, 0 otherwise |
| LastofBurst | Bool | 1 if last of a burst, 0 otherwise |
| OcpWidth | Unsigned int | Width of the OCP channel |
| Thread | Unsigned int | OCP thread |
| Name | String | Hierarchical name of the injecting initiator |
| Transaction ID | Unsigned long long | A unique ID for each transaction entering the system |
| Path:Resource_type:Resource:SimTime[ ] | String | N string fields, each identified by path (request, response), resource type (TAT, IAH), resource and simulation time, ordered by simulation time |
| Target | String | Target of the transfer |

The number of fields N for Path:Resource_type:Resource: SimTime[ ] is set to a maximum value depending on the configuration of the design. If the number of fields (M) required to load the data specific to a particular transaction is less than the available number of fields N, the last N-M fields are left blank.

Queue Monitor Table

TABLE 4

| Field | Type | Description |
|---|---|---|
| SimTime | Double | Simulation time at which the transfer enters the system |
| DeltaCycle | Double | DeltaCycles spent at a resource |
| Resource Name | String | Name of the resource |
| Queue name | String | Name of the queue (Turnaround queue, RS) |
| Thread | Unsigned int | Thread ID |
| Full | Bool | 1 if full, 0 otherwise |
| Size | Unsigned int | Size of the queue |
| Operation | Bool | 1 if enqueue, 0 if dequeue |
| Transaction ID | Unsigned long long | Transaction ID of the transfer being enqueued or dequeued |
| Resource type | String | Type of resource (RS, IA etc) |

Latency Table

The latency table is optionally loaded if the burst specific information such as its end-to-end latency, and the memory channels the burst is routed to. In order to load this table, the transaction inject table, and the transaction propagate tables must be loaded. In addition, the RTL conf file should also be specified.

TABLE 5

| Field | Type | Description |
|---|---|---|
| Transaction ID | Unsigned long long | A unique ID for each transaction entering the system |
| IP | String | Name of the Sonics IP (default: endToend) |
| Exchange | String | Exchange within the Sonics IP (default: endToend) |
| Req_st_time | Double | Start time of request path of the burst |
| Req_end_time | Double | End time of request path of the burst |
| Req_latency | Double | Request path latency |
| Resp_st_time | Double | Response path start time |
| Resp_end_time | Double | Response path end time |
| Resp_latency | Double | Response path latency |
| Total_latency | Double | End-to-end latency |
| Boundarycross[8] | Unsigned int | The transfers in the burst that cause a channel boundary cross. 0 if channel boundary was not crossed |
| InterBurstBoundaryCross | Bool | 1 if two consecutive bursts go to different channels, else 0 |
| Initiator | String | The initiator originating the burst |
| Thread | Unsigned int | Initiator thread |
| Target[8] | Bool | 1 if any transfer of the burst was routed to the target targetName[i], i = 0, 7 |

In the table described above, fields 4 through 10 are specified per IP and exchange, as well as for the entire product.

When the values are specified for the entire product, the terms endToend are used in the IP and the exchange fields.

Thread Arbitration Table

TABLE 6

| Field | Type | Description |
|---|---|---|
| Transaction ID | Unsigned long long | A unique ID for each transaction entering the system |
| SimTime | Double | Simulation time at which the transfer enters the system |
| DeltaCycle | Double | DeltaCycles spent at a resource |
| Resource Name | String | Name of the resource |
| Path | String | Request or response path |
| Resource type | String | Type of the resource (IAH, TAT, MEMMAX etc) |
| Path | String | Request/Response path |
| Credit Bit | Boolean | 1 if set |
| Epoch state bit | Boolean | 1 if set |
| Rollover indicator | Boolean | 1 if set |
| Thread | Unsigned int | Winner thread |
| QOS Mode | Unsigned int | The QoS mode of the winner thread |
| Credit counter value | Unsigned int | Value of the credit counter of each thread |
| Data | Unsigned int | Amount of data transferred by the winner thread |
| Cumulative data | Unsigned int | Cumulative amount of data transferred up-to the current simulation time on the winner thread |

Link Arbitration Table

TABLE 7

| Field | Type | Description |
|---|---|---|
| Transaction ID | Unsigned long long | A unique ID for each transaction entering the system |
| SimTime | Double | Simulation time at which the transfer enters the system |
| DeltaCycle | Double | DeltaCycles spent at a resource |
| Resource Name | String | Name of the resource |
| Path | String | Request or response path |
| Resource type | String | Type of the resource (IAH, TAT, MEMMAX etc) |
| Path | String | Request/Response path |
| Credit Bit | Boolean | 1 if set |
| Epoch state bit | Boolean | 1 if set |
| Rollover indicator | Boolean | 1 if set |
| Thread | Unsigned int | Winner thread |
| Branch | Unsigned int | Winner branch |

DL Monitor Table

TABLE 8

| Field | Type | Description |
|---|---|---|
| Transaction ID | Unsigned long long | A unique ID for each transaction entering the system |
| SimTime | Double | Simulation time at which the transfer enters the system |
| DeltaCycle | Double | DeltaCycles spent at a resource |

TABLE 8-continued

| Field | Type | Description |
|---|---|---|
| Source | String | Source of the link |
| Sink | String | Sink of the link |
| Path | String | Request or response path |
| Path | String | Request/Response path |
| Sthreadbusy | String | String corresponding to the bit vector |
| Mthreadbusy | String | String corresponding to the bit vector |
| Packwords | String | String corresponding to the bit vector |

Topology Specification Table

TABLE 9

| Field | Type | Description |
|---|---|---|
| Node | String | Name of the current node |
| Parents[ ] | String | Array of parents |
| Children[ ] | String | Array of children |
| Path | String | Request or response path |
| Clock domain[ ] | Double | Array of clock domains at which the resource operates |

Figure 4:
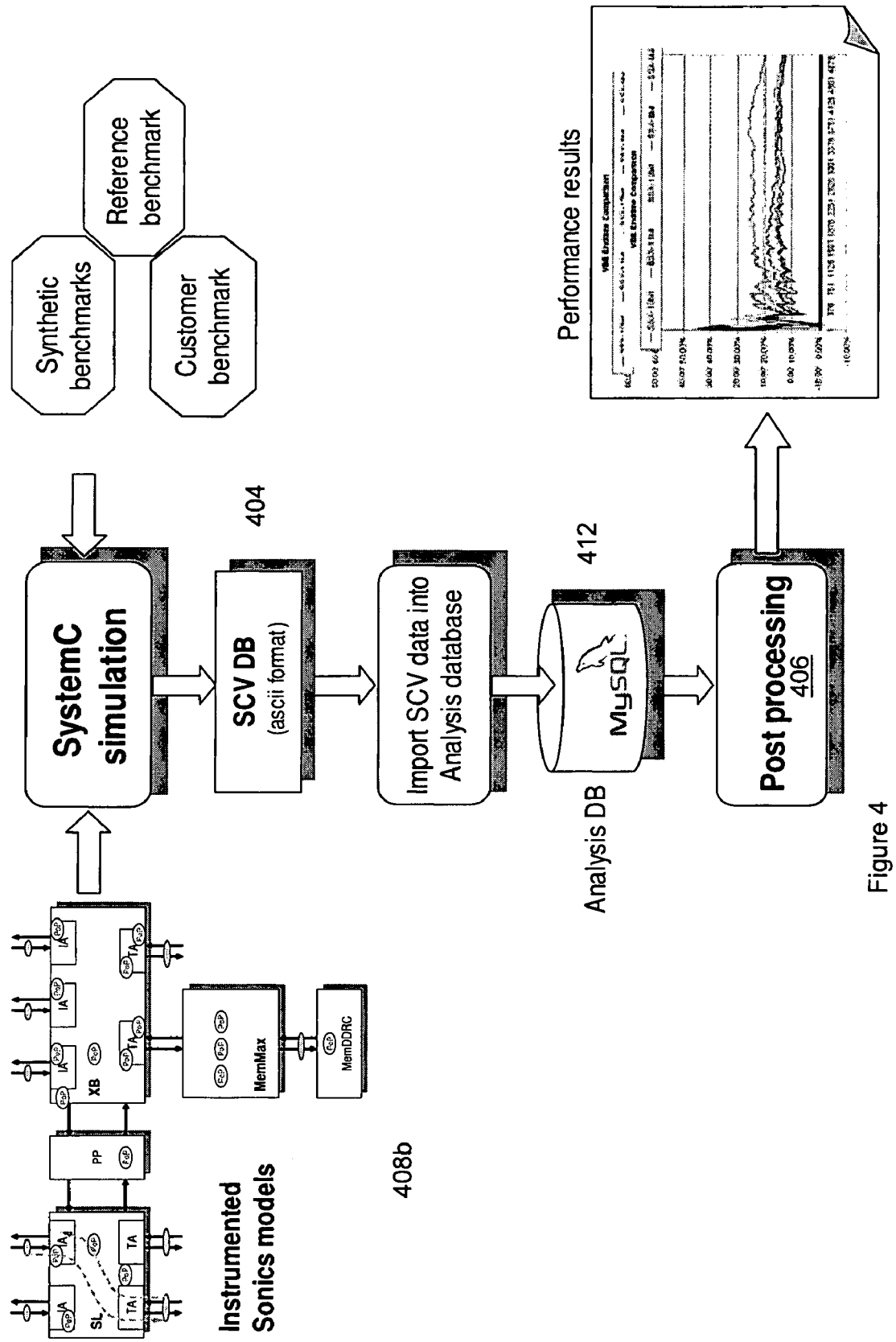
FIG. 4 illustrates a block diagram of an embodiment of a performance analysis flow of a modeled simulation of the interconnect in written in the SystemC programming language.

FIG. 4 illustrates a block diagram of an embodiment of a performance analysis flow of a modeled simulation of the interconnect in written in the SystemC programming language. The modeled SystemC simulation 408b is populated with software instrument test points to capture transactional data across and within the interconnect of the modeled System on a Chip. The modeled SystemC simulation 408b also receives industry standard synthetic benchmarks, user supplied benchmarks, and reference bench marks. All of the captured data is then sent to a SCV Database 404 in an ASCII format. The SCV data is then imported into a structured query language (SQL) Analysis database 412. The structured query language (SQL) database 412 receives raw data generated from the performance simulation of the interconnect being modeled with the SystemC model 408b that has a level of abstraction higher than an RTL model of that interconnect.

In an embodiment, much of the internal configuration of the interconnect in the simulation model 408b is derived from the rtl.conf file. Many of the internal components and connections are not easily determined by the user. For this reason, the user can query the SQL database 412 to get an ordered list of agents/components and links on a path.

The performance database makes available a set of methods that allow an internal/external user to query the performance database for performance data captured during simulation. These methods are made available as a C/C++ library, which allows the basic primitives to be aggregated in an arbitrary fashion, so that more complex performance analysis programs can be automated and re-used. Additionally, the database makes available all rtl.conf information via a set of queries.

The rtl.conf contains information about which clock domain each exchange/agent belongs to. However, clock frequencies may be varied dynamically, and in the future asynchronous crossings will be permitted in Interconnect. For this reason, the API for the relational database has a set of algorithms to translate back and forth between simulation-time and cycle time in each clock domain.

The DB API sends the raw data in the form of the input data to the query tool 406 for post processing and analysis of the performance data from the simulation. Performance analyzers (PAs) analyze the simulation-time information captured by the software instrument test points from the System on a Chip design under test (DUT) 408b. PAs may have two forms: Regular PAs and derived PAs. Regular PAs return data recorded at simulation time. On the other hand, derived PAs are calculated from one or more regular PAs. For example, observing the enqueue and dequeue times of a given queue would be a regular PA. A more complex PA would be to check if the responses from different channels are re-ordered properly at the response path mergers.

The database Application Programming Interface (Db Application Programming Interface) consists of the basic framework to connect to the database, and store and load data. On loading from the database, Application Programming Interface returns the elements of the row of the table in the database as a data structure. Consider an example with mysql database 412. The connectivity is established as follows:

```
// Database connection variables;
MY structured query language *conn;
MY structured query language_RES *res;
MY structured query language_ROW *row;
   char *server = "server"
   char *user = "user"
   char *password = "password"
   char *database = "Interconnect_database"
   // Open the database connection
   mysql_real_connect (conn, server, user, password, database, 0, NULL, 0);
```

Once the mysql database 412 connection is established, a database query to load or store data can be formulated as a string, and sent to the mysql database 412. The Db Application Programming Interface thus provides a data-structure, which can be used to output the required data. A few examples follow.

A user may use the select clause of the mySql database query framework to tracking a transaction by selecting all lines of the transaction propagate table with the specified transaction ID, and send the query to the database using the Application Programming Interface.

A user may use the select clause of the mySql database query framework to select a transaction by selecting all lines of the latency table, with the specified filters, and send the query to the database using the Application Programming Interface.

A user may use the select clause of the mySQL database query framework to obtain queue details by selecting the select clause to select the queue along with the filters.

A user may use the select clause of the mySQL database query framework to obtain queue utilization recursively over time windows (similar to latency distribution) and average the queue utilization over time windows.

A user may use the select clause of the mySQL database query framework to select the transaction ID from the latency table where the filters corresponding to the query are applied to determine backpressure occurring at merger units in the interconnect.

Figure 5:
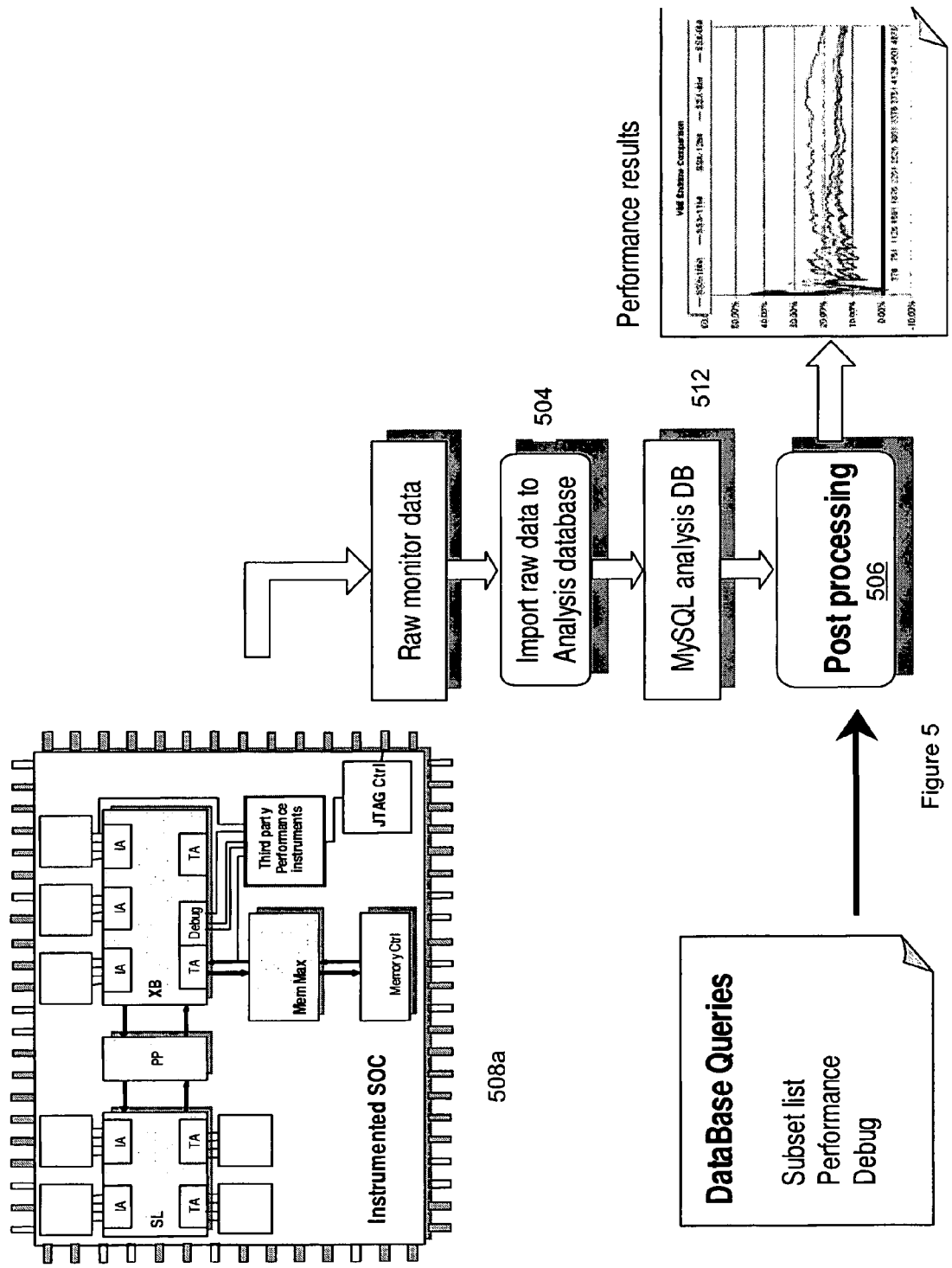
FIG. 5 illustrates a block diagram of an embodiment of a performance analysis flow of a RTL modeled System on a Chip with one or more bus interconnects having performance monitors embedded in the chip.

FIG. 5 illustrates a block diagram of an embodiment of a performance analysis flow of a RTL modeled System on a Chip with one or more bus interconnects having instrumented performance monitor test points embedded in the chip. The RTL simulation 508a is populated with software instrument test points to capture transactional data across and within the interconnect of the modeled System on a chip. All of the captured data is then sent to a SCV DB 504. The SCV data is then imported into a structured query language (SQL) Analysis database 512. The structured query language (SQL) database 512 receives raw data generated from a performance simulation of the interconnect being modeled with a register transfer level (RTL) model 508*a* having a lower level of abstraction to the fabricated interconnect than the SystemC model. The SQL database 512 sends the raw data in the form of the input data to the query tool 506 for post processing and analysis of the performance data from the simulation.

Figure 6:
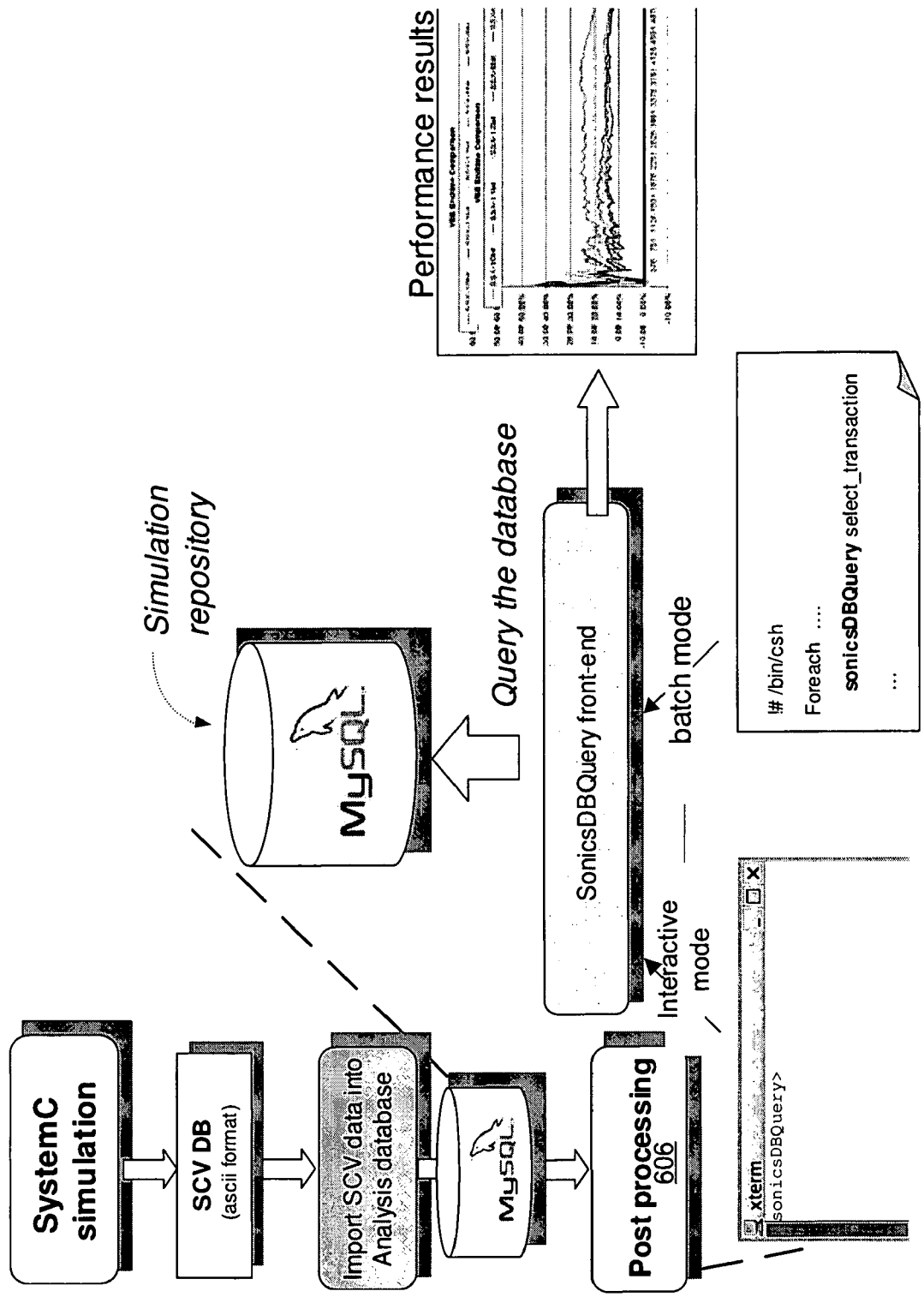
FIG. 6 illustrates a block diagram of an embodiment of post processing of the database with the query tool.

FIG. 6 illustrates a block diagram of an embodiment of post processing of the database with the query tool. The transaction traffic data is imported into the database to leverage post-processing capabilities with the query tool 606. The query tool 606 allows a user to analyze data such as Input formats including input sequence files, and OCP traces; traffic distribution analysis such as system activity, concurrency, etc; requests per initiator per thread over time; address space utilization; memory accesses; address pattern (block transfer, raster scan and other similar performance data.

Figure 7:
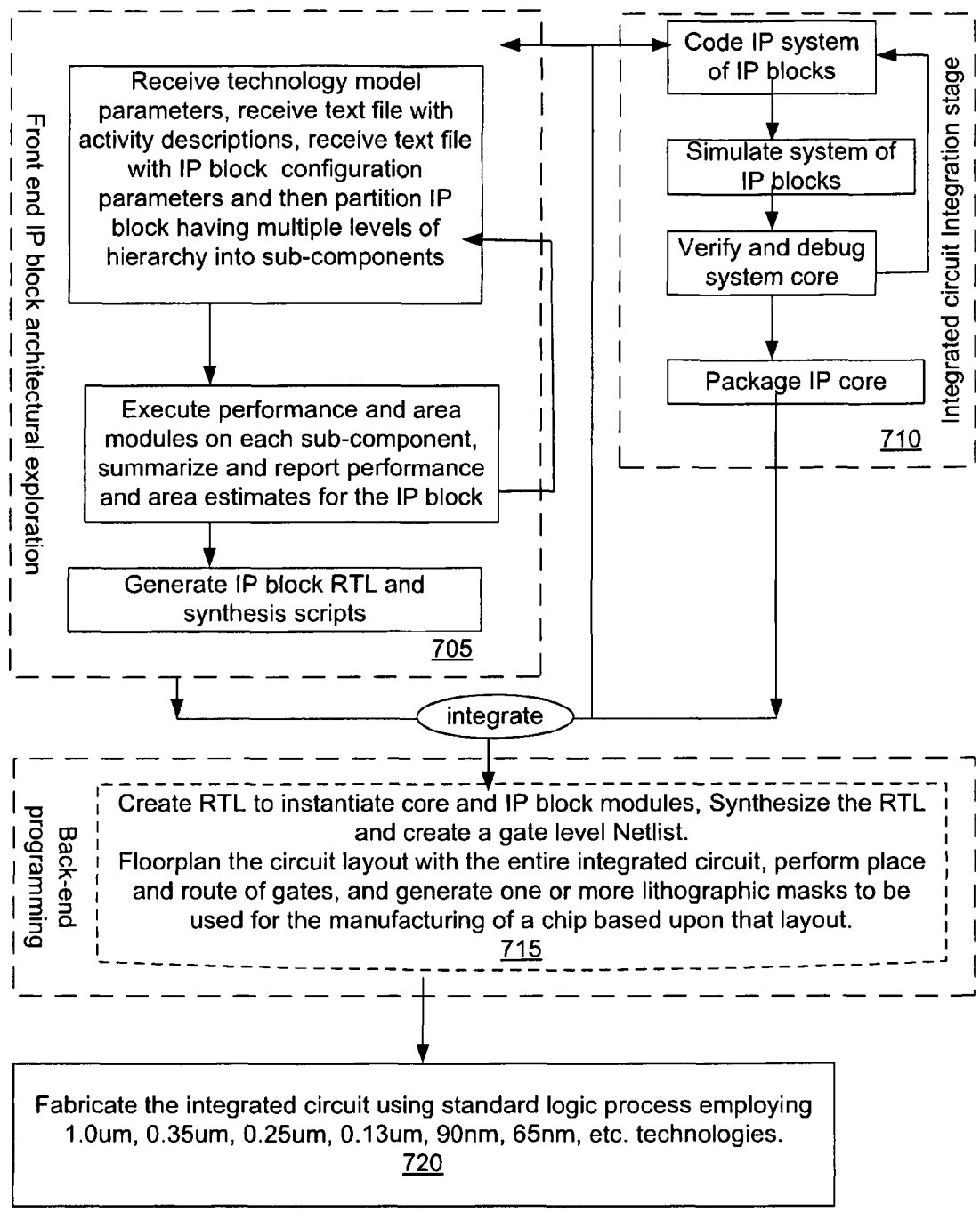
FIG. 7 illustrates a flow diagram of an embodiment of an example of a process for generating a device, such as a System on a Chip, with the designs and concepts discussed above for the Interconnect of the device.

FIG. 7 illustrates a flow diagram of an embodiment of an example of a process for generating a device, such as a System on a Chip, with the designs and concepts discussed above for the Interconnect of the device. The example process for generating a device from designs of the Interconnect may utilize an electronic circuit design generator, such as a System on a Chip compiler, to form part of an Electronic Design Automation (EDA) toolset. Hardware logic, coded software, and a combination of both may be used to implement the following design process operations using an embodiment of the EDA toolset. The EDA toolset such may be a single tool or a compilation of two or more discrete tools. The information representing the apparatuses and/or methods for the circuitry in the Interconnect, etc may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses and/or methods described herein.

Aspects of the above design may be part of a software library containing a set of designs for components making up the Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 705, the EDA tool set may receive a user-supplied text file having data describing configuration parameters and a design for at least part of an individual intellectual property (IP) block having multiple levels of hierarchy. The data may include one or more configuration parameters for that IP block. The IP block description may be an overall functionality of that IP block such as an interconnect. The configuration parameters for the interconnect IP block may be number of address regions in the system, system addresses, how data will be routed based on system addresses, etc.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 710, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 715, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 720, a fabrication facility may fabricate one or more chips with the signal generation circuit utilizing the lithographic masks generated from the EDA tool set's circuit design and layout. A prototype of an integrated circuit with an interconnect having one or more performance monitors may be fabricated. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that provides information in a form readable by a machine (e.g., a computer). For example, a machine-readable medium may include, but is not limited to: read merely memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The modeling tool may have its instructions, executable code sequences, data files, etc stored on a machine-readable storage medium. A machine-readable storage medium may include any mechanism that provides information in a form readable by a machine (e.g., a computer). For example, a machine-readable medium may include, but is not limited to: read merely memory (ROM); random access memory (RAM); magnetic disk storage media; optical storage media; flash memory devices; DVD's; electrical, optical, digital signals); EPROMs; EEPROMs; FLASH, magnetic or optical cards; or any other type of media suitable for storing electronic instructions.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components. SystemC was used as an example software programming language that could be used but others could also be used. RTL was used as an example hardware description language that was used but others could be used as well. The hardware logic consists of electronic circuits that follow the rules of Boolean Logic, software that contain patterns of instructions, or any combination of both. The invention is to be understood as not limited by the specific embodiments described herein, but merely by scope of the appended claims.

What is claimed is:

1. An apparatus for interconnect analysis of an electronic design, the apparatus comprising:
a relational database with defined tables designed for interconnect analysis of transactions occurring between initiator intellectual property (IP) cores and target IP cores of the electronic design;
a relational database application programming interface (API) suite to format input data for storing in the defined tables, to retrieve data from the defined tables based on performing a query, and to execute an algorithm to perform specific interconnect performance analysis requested by the query, wherein any functions of the API suite that are implemented in software are tangibly stored on a machine readable medium in an executable format; and
a SystemC verification (SVC) database to receive SCV data generated from a first performance simulation of the interconnect being modeled with a SystemC model having a first level of abstraction, wherein the SCV database receives the SCV data from the first performance simulation of the interconnect and the API suite receives the SCV data in a form of the input data.

2. The apparatus for interconnect analysis of claim 1, further comprising:
a front end query tool to invoke one or more interconnect performance analysis in the relational database API suite for performance analysis, wherein the query tool is one of a part of a code in interconnect simulation itself, or a front end stand alone program that invokes one or more queries in a set of queries in the relational database API suite.

3. The apparatus for interconnect analysis of claim 1, further comprising: a structured query language (SQL) database to receive raw data generated from a second performance simulation of the interconnect being modeled with a register transfer level (RTL) model having a second level of abstraction, the application programming interface to receive the raw data in the form of the input data from the SQL database.

4. The apparatus for interconnect analysis of claim 1, wherein the input data comprises SystemC verification (SCV) data received directly from a performance simulation of an interconnect being modeled with a SystemC model having the first level of abstraction.

5. The apparatus for interconnect analysis of claim 1, wherein the relational database API suite contains a set of simple queries that involve retrieving the data from the relational database based on filters, as well as a set of complex queries that operate on multiple simple queries to execute a complex algorithm.

6. The apparatus for interconnect analysis of claim 1, wherein the relational database API suite sends the raw data in the form of the input data to a query tool for post processing and analysis of performance data, wherein the relational database API suite comprises a plurality of user defined queries and a plurality of pre-specified standard queries that are specified in the API and the sent raw data includes data derived from a first performance simulation of the interconnect being modeled with a first software model written in a first programming language having a first level of abstraction as well as data derived from a second performance simulation of the interconnect being modeled written in a hardware description language model having a second level of abstraction.

7. The apparatus for interconnect analysis of claim 5, wherein the set of simple queries includes at least one of the following query primitives: a select transaction query to select a transaction's details based on one or more constraints, a queue details query to enqueue and dequeue time in different queues, a boundary cross query to determine all transactions that cross a channel boundary, a get initiator query to get the initiator of a given transaction, a get end time query to get an end time of a given transaction, a thread arbitration query to check the arbitration states of different units, and a thread busy query to monitor different thread busy signals.

8. The apparatus for interconnect analysis of claim 5, wherein the set of complex queries includes at least one of the following complex queries: a track transaction query to track a transaction's life in an interconnect associated with the interconnect, an overall latency query to determine an average, peak, and minimum latency of transactions over a time window, a latency distribution query to determine a distribution of latency over time, a response reorder query to check if responses are reordered correctly, a merger backpressure query to determine an average backpressure at response mergers, an address distribution query to determine a distribution of addresses per input sequence, a channel processing query to processing input sequences for channel crossing and channel distribution, a page hit statistic query to obtain page hit statistics per burst transaction, and a page miss statistic query to obtain page miss statistics per burst transaction.

9. A method for interconnect analysis, comprising:
   collecting data based on executing a first simulation associated with a first model having a first level of abstraction that models an interconnect of an electronic design;
   establishing a connection to store data from the first simulation in a relational database;
   formatting the data for storage in the relational database;
   storing the formatted data into defined tables;
   collecting data based on executing a second simulation associated with a second model having a second level of abstraction that models an interconnect of the electronic design;
   establishing a connection to store data from the second simulation in the relational database;
   performing a query from a set of queries in the application programming interface of the relational database to obtain performance analysis details in the collected data; and
   analyzing data retrieved with the query by executing an algorithm for interconnect analysis, wherein said executing the algorithm compares data from the first and the second simulation in order to determine if the interconnect is functioning properly during run-time of the first and second simulations.

10. The method of claim 9, wherein each defined table is associated with an instrumented test point located in the interconnect of the electronic design to monitor transactions occurring between initiator intellectual property (IP) cores and target IP cores of the electronic design.

11. The method of claim 9, wherein a set of the defined tables comprise at least two of the following tables: a transaction table, a queue monitor table, a latency table, a thread arbitration table, a link arbitration table, a DL monitor table, and a topology specification class table.

12. The method of claim 11, wherein the defined tables further comprise a tracking table to track transaction specific information and improve performance of queries.

13. The method of claim 9, wherein the first model comprises a SystemC model and the second model comprises a register transfer level (RTL) model.

14. A machine-readable medium storing executable program instructions which when executed cause a data processing system to perform the operations of claim 9.

15. A system for system bus interconnect analysis of an electronic design, the system comprising:
   a relational database that has defined tables designed for interconnect analysis of transactions occurring between initiator intellectual property (IP) cores and target IP cores of the electronic design of a System on a chip, wherein the relational database to store formatted data into the defined tables and the interconnect has instrument test points located in the interconnect of the electronic design to monitor transactions occurring between initiator intellectual property (IP) cores and target IP cores of the electronic design; and
   an application programming interface (API) suite to convert observed data from a simulation in its native format to a relational database specific format, wherein the API suite establishes a connection with the relational database, wherein the API suite has a set of simple queries that involve retrieving the data from the relational database based on filters and a set of complex queries that operate on multiple simple queries to execute a complex algorithm, wherein performance data in the formatted data is obtained from execution of the simulation and the simulation invokes one or more of the queries to conduct performance analysis during the simulation, wherein any functions of the API suite that are implemented in software are tangibly stored on a machine readable medium in an executable format.

16. The system for system bus interconnect analysis of the electronic design of claim 15, wherein each defined table is associated with a type of the instrumentation test point.

17. The system for system bus interconnect analysis of the electronic design of claim 16, wherein the simulation calls the API suite to format input data for storing in the defined tables and the input data includes SystemC verification (SCV) data received directly from a performance of the simulation of the interconnect being modeled with a SystemC model having a first level of abstraction, wherein the relational database is also storing input data from a second simulation of the interconnect being modeled with a register transfer level (RTL) model having a second level of abstraction.

18. The system for system bus interconnect analysis of the electronic design of claim 17, wherein the API suite for the relational database has a set of algorithms to translate back and forth between simulation-time and cycle time in a clock domains of the first and second simulations.

* * * * *